United States Patent
Honda et al.

(10) Patent No.: US 8,675,708 B2
(45) Date of Patent: Mar. 18, 2014

(54) LASER OSCILLATION APPARATUS

(75) Inventors: Yosuke Honda, Tsukuba (JP); Junji Urakawa, Tsukuba (JP)

(73) Assignee: Inter-University Research Institute Corporation High Energy Accelerator Research Organization, Tsukuba-shi (JP)

( * ) Notice: Subject to any disclaimer, the term of this patent is extended or adjusted under 35 U.S.C. 154(b) by 0 days.

(21) Appl. No.: 13/813,810

(22) PCT Filed: Aug. 3, 2011

(86) PCT No.: PCT/JP2011/067730
§ 371 (c)(1),
(2), (4) Date: Feb. 1, 2013

(87) PCT Pub. No.: WO2012/018034
PCT Pub. Date: Feb. 9, 2012

(65) Prior Publication Data
US 2013/0128906 A1 May 23, 2013

(30) Foreign Application Priority Data
Aug. 5, 2010 (JP) ................. 2010-176690

(51) Int. Cl.
*H01S 3/067* (2006.01)
*H01S 3/13* (2006.01)
*H01S 3/23* (2006.01)
*H05G 2/00* (2006.01)

(52) U.S. Cl.
CPC ........... *H01S 3/06791* (2013.01); *H01S 3/1307* (2013.01); *H01S 3/1305* (2013.01); *H05G 2/00* (2013.01); *H01S 3/2308* (2013.01)
USPC ....... 372/94; 359/346; 359/341.4; 359/337.1; 372/29.011; 372/29.023; 372/6

(58) Field of Classification Search
CPC ... H01S 3/1305; H01S 3/1306; H01S 3/1307; H01S 3/083; H01S 3/06791
USPC ............... 359/341.4, 341.41, 341.42, 341.43, 359/346, 337.1; 372/94, 29.011, 29.023
See application file for complete search history.

(56) References Cited

U.S. PATENT DOCUMENTS 4,530,097 A * 7/1985 Stokes et al. ................. 372/6
(Continued)

FOREIGN PATENT DOCUMENTS

| JP | H06-318751 A | 11/1994 |
|---|---|---|
| JP | 2000-244044 A | 9/2000 |

(Continued)

OTHER PUBLICATIONS

Chouffani, K., et al. "Laser-Compton Scattering as a Potential Bright X-Ray Source." (2003). http://www2.cose.isu.edu/~cole/Class/Phys649/LCS.pdf.*

(Continued)

*Primary Examiner* — Mark Hellner
*Assistant Examiner* — Ari M Diacou
(74) *Attorney, Agent, or Firm* — Manabu Kanesaka

(57) ABSTRACT

Provided is a laser oscillation apparatus capable of stabilizing resonance even when finesse of an optical resonator is increased and generating stronger laser light than that of a traditional apparatus by accumulating laser light in the optical resonator. The laser oscillation apparatus includes a laser light source which generates laser light for excitation, a fiber amplifier which generates laser light with a desired wavelength when the laser light generated at the laser light source for excitation is supplied, an optical resonator, an optical isolator which is interposed between the optical resonator and the fiber amplifier and which guides the laser light from the fiber amplifier to one side of the optical resonator while blocking laser light in the opposite direction, a circulation optical path which accelerates resonance as introducing laser light emitted from the other side of the optical resonator and returning the laser light to the optical resonator via the fiber amplifier and the optical isolator, and a modulator which performs amplitude modulation on the laser light in the circulation optical path.

5 Claims, 14 Drawing Sheets

(56) References Cited

U.S. PATENT DOCUMENTS

| | | | |
|---|---|---|---|
| 4,685,107 A * | 8/1987 | Kafka et al. | 372/6 |
| 5,359,612 A * | 10/1994 | Dennis et al. | 372/18 |
| 5,363,192 A * | 11/1994 | Diels et al. | 356/461 |
| 5,537,243 A * | 7/1996 | Fatehi et al. | 359/341.1 |
| 5,590,142 A * | 12/1996 | Shan | 372/18 |
| 6,606,331 B2 * | 8/2003 | Sousa et al. | 372/32 |
| 6,738,408 B2 * | 5/2004 | Abedin | 372/94 |
| 7,369,722 B2 * | 5/2008 | Yilmaz et al. | 385/27 |
| 7,492,795 B1 * | 2/2009 | Delfyett et al. | 372/29.011 |
| 7,596,325 B2 * | 9/2009 | Park et al. | 398/185 |
| 2002/0044574 A1 * | 4/2002 | Abedin | 372/18 |
| 2002/0176452 A1 * | 11/2002 | Lin et al. | 372/18 |
| 2003/0007541 A1 * | 1/2003 | Sousa et al. | 372/94 |
| 2004/0228376 A1 * | 11/2004 | Dane et al. | 372/32 |
| 2005/0078716 A1 * | 4/2005 | Liu | 372/6 |
| 2005/0201432 A1 * | 9/2005 | Uehara et al. | 372/30 |
| 2005/0259698 A1 * | 11/2005 | Park et al. | 372/18 |
| 2006/0043079 A1 * | 3/2006 | Dane et al. | 219/121.85 |
| 2006/0291521 A1 * | 12/2006 | Ilday et al. | 372/94 |
| 2007/0153289 A1 * | 7/2007 | Yilmaz et al. | 356/464 |

FOREIGN PATENT DOCUMENTS

| | | | | |
|---|---|---|---|---|
| JP | 2000244044 A | * | 9/2000 | H01S 3/098 |
| JP | 2009-016488 A | | 1/2009 | |
| WO | 2011/016379 A1 | | 2/2011 | |

OTHER PUBLICATIONS

PCT, "International Search Report and Written Opinion for PCT/JP2011/067730", Aug. 30, 2011.

G. T. Harvey et al., "Harmonically mode-locked fiber ring laser with an internal Fabry-Perot stabilizer for soliton transmission", Optics Letters, Jan. 15, 1993, vol. 18, No. 2, pp. 107-109.

P. W. Smith, "Stabilized, Single-Frequency Output from a Long Laser Cavity", IEEE Journal of Quantum Electronics, 1965.11, vol. QE-1, No. 8, pp. 343-348.

Yosuke Honda et al., "Photon Target using Self-start Build-up Cavity for Laser Compton Sources", Proceedings of Particle Accelerator Society Meeting 2009, JAEA, Tokai, Naka-gun, Ibaraki, Japan, pp. 341-343.

D. Oepts et al., "Selection of Single-Mode Radiation from a Short-Pulse Free-Electron Laser", Physical Review Letters, May 24, 1993, vol. 70, No. 21, pp. 3255-3258.

* cited by examiner center: 357MHz, span: 1MHz center: 357MHz, span: 100MHz center: 357MHz, span: 1MHz center: 357MHz, span: 50MHz center: 357MHz, span: 1MHz center: 357MHz, span: 100MHz FIG. 8(a)  FIG. 8(b)
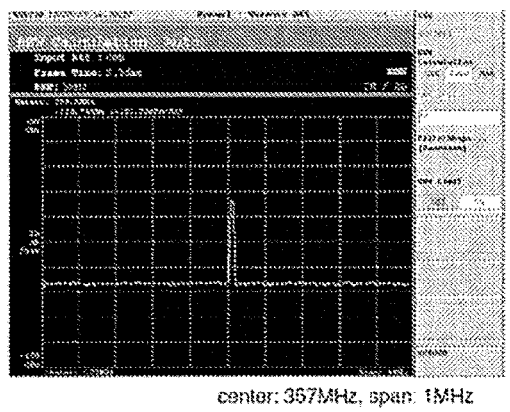 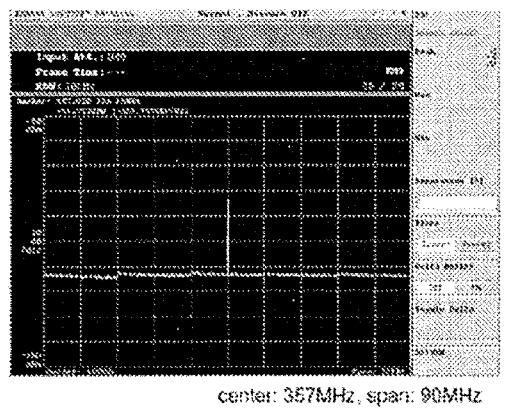
FIG. 9
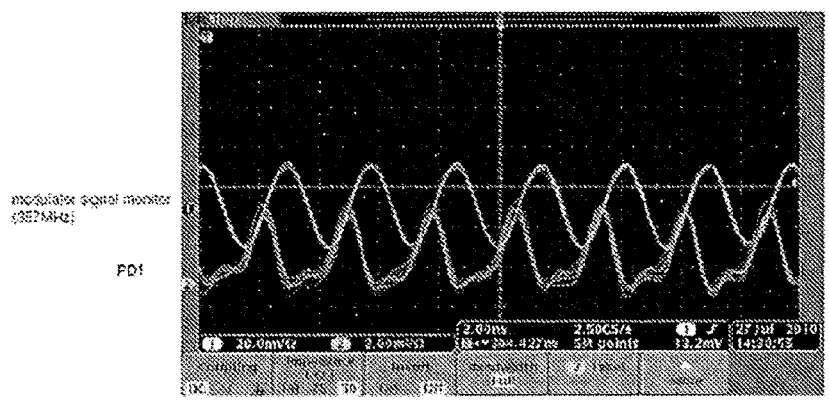

center: 357MHz, span: 1MHz center: 357MHz, span: 100MHz center: 357MHz, span: 1MHz center: 357MHz, span: 50MHz FIG. 14(a)  　　　　FIG. 14(b)
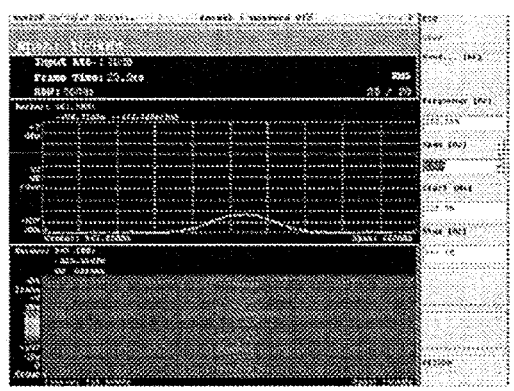
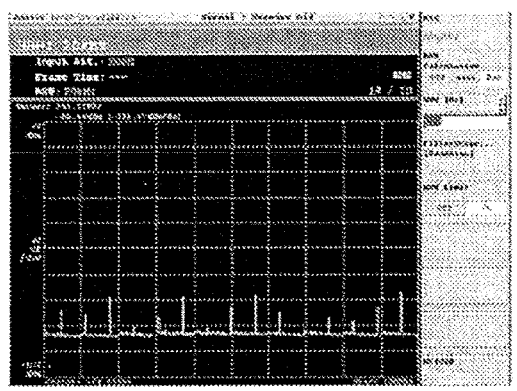
FIG. 15
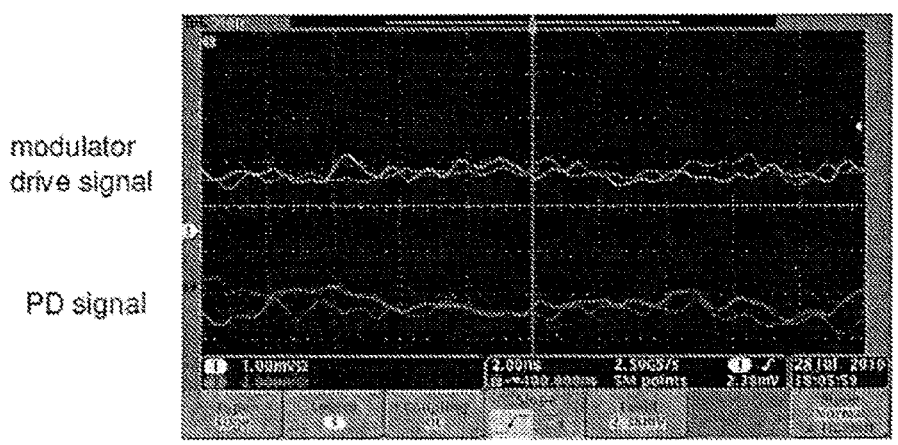

FIG. 16(a)
FIG. 16(b)
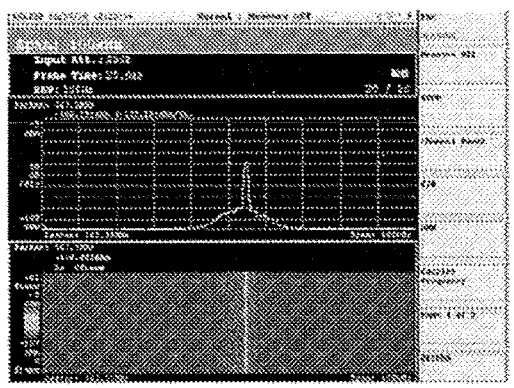
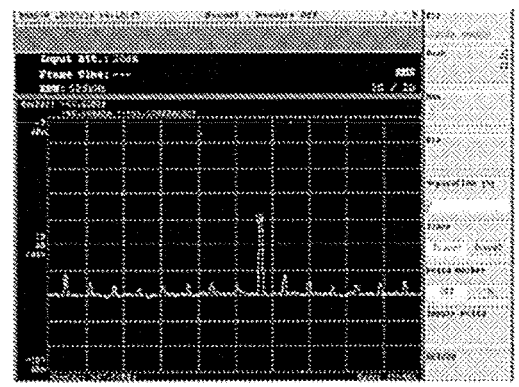
FIG. 17(a)
FIG. 17(a)
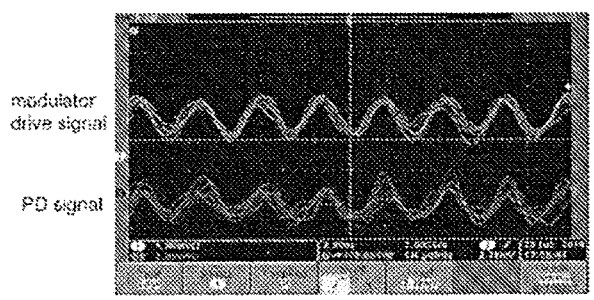
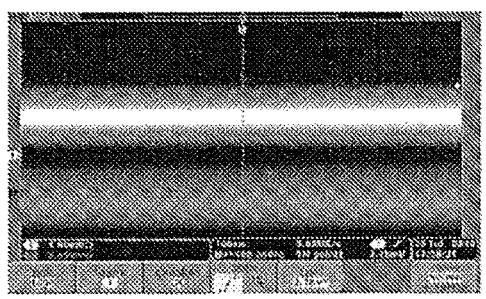

LASER OSCILLATION APPARATUS

RELATED APPLICATIONS

The present application is National Phase of International Application No. PCT/JP2011/067730 filed Aug. 3, 2011, and claims priority from Japanese Application No. 20010-176690 filed Aug. 5, 2010.

TECHNICAL FIELD

The present invention relates to a laser oscillation apparatus capable of generating strong laser light using a self-oscillation system which includes an optical accumulation resonator and obtaining higher peak strength with pulse driving.

BACKGROUND ART

Recently, there has been performed development of a small-sized light source device utilizing laser Compton scattering. Strength of such a light source device as a light source depends on strength of a realizable laser target. In a case of being based on pulse-driven linear accelerator, laser light is adopted with a method to use high-strength pulse laser or to be used as being temporally burst-amplified.

In contrast, in a case to increase mean strength of laser with a continuously-operated system based on an accumulation ring type apparatus and a superconducting accelerator utilizing Compton scattering, high-strength laser targets are continuously required.

In a traditional X-ray generating device (e.g., see Patent Literature 1) which generates an X-ray with laser inverse Compton scattering at collision between laser light and electrons, strong laser light is generated using a laser generating device which includes a known high-strength mode-locking oscillator (e.g., high-strength mode-locking oscillator having performance of 500 W, 10 psec/pulse, wavelength of 1064 nm, and a repetition frequency of 150 MHz) and an optical accumulation resonator.

Here, the optical accumulation resonator denotes an optical resonator which confines laser light in a space formed by closing an optical path with a plurality of mirrors. This is a promising technology with which high-strength laser light can be continuously actualized as effectively strengthening light from a relatively low-power laser light source.

FIG. 22 illustrates a structural example of a traditional laser accumulation apparatus. Output from a laser resonator is accumulated in an external resonator which is separately prepared. For accumulating light in the optical resonator, it is required to satisfy conditions under that a steady wave is generated in the optical resonator, that is, that a distance between mirrors is matched with an integral multiple of a half wavelength. A resonance width thereof is determined by a reflection rate of resonator mirrors and becomes narrow with usage of mirrors having a high reflection rate for obtaining a higher increase rate. With a resonator having an increase rate of 1000, the resonance width becomes on the order of subnanometers in positional accuracy of the resonance mirrors, so that a resonance state is easily destroyed with environmental disturbance such as vibration. Here, in order to maintain a laser accumulation state as mechanically controlling resonance conditions, it is required to perform advanced feedback control with piezoelectric driving of the resonance mirrors. Presently, technical limitations for maintaining stable resonance stay with the increase rate on the order of 1000.

CITED LITERATURE

Patent Literature

Patent Literature 1: Japanese Patent Application Laid-Open 2009-16488

SUMMARY OF THE INVENTION

Problems to be Solved by the Invention

However, since a high-strength mode-locking oscillator used in such a traditional laser oscillation apparatus is extremely expensive, there has been a problem that the laser oscillation apparatus itself becomes expensive. Further, a traditional laser oscillation apparatus has a drawback to require an advanced technology for controlling a resonance state of an optical resonator in high accuracy, which determines technical limitation of an increase rate.

Further, with a traditional laser oscillation apparatus, there has been a problem that stable accumulation cannot be performed without considerable high accuracy of feedback control for accumulating laser pulses generated by a high-strength mode locking oscillator as guiding to an optical accumulation resonator. Further, with a traditional laser oscillation apparatus, there has been a problem that laser pulse energy in an optical accumulation resonator can be obtained only on the order of 100 µJ/pulse with accumulation amplification by a factor only on the order of 1000.

In view of the above, an object of the present invention is to provide a laser oscillation apparatus capable of stabilizing resonance even when finesses (an accumulation amplification degree) of an optical resonator is increased and generating laser light stronger than a traditional one by accumulating laser light in the optical resonator.

Means for Solving the Problem

To address the above issues, the present invention provides a laser oscillation apparatus which generates pulse light with an optical resonator and a plurality of fiber amplifiers arranged at a circulation optical path, including a laser light source which generates laser light for excitation, a first fiber amplifier which includes a mode-locking type amplitude modulator to operate light with a desired frequency to be grown as being an integral multiple of a frequency corresponding to an optical path length of the circulation optical path and which emits pulse laser light with the desired frequency while the laser light generated by the laser light source is entered, an optical resonator which resonates and accumulates the pulse laser light emitted from the first fiber amplifier, a second fiber amplifier which includes an adjustment cable corresponding to a wavelength of the pulse laser light and which amplifies the pulse laser light emitted from the optical resonator, a first photodiode which extracts a part of the laser light from the first fiber amplifier, a splitter which divides an output signal of the first photodiode into two, a first RF amplifier which amplifies one of the two output signals from the splitter, a band-pass filter which extracts an RF signal of the laser light with the desired frequency among output signals of the first RF amplifier, a phase modulator which performs phase modulation of the RF signal passing through the band-pass filter, a second RF amplifier which drives the amplitude modulator with the phase-modulated RF signal, and a second photodiode which monitors the other of the two output signals from the splitter. In the above, the pulse laser light is self-oscillation-amplified and accumulated in the optical resonator as circling on the circulation optical path which is structured with the first fiber amplifier, the optical resonator and the second fiber amplifier. Further, the adjustment cable on the circulation optical path is a cable which finely adjusts the optical path length of the circulation optical path.

Here, the pulse laser light is amplified to at least 10,000 times of strength of the laser light for excitation owing to the self-oscillation amplification.

Here, the optical resonator has a feature of being a Fox Smith interferometer type resonator including at least two concave mirrors which are mutually faced at a predetermined interval.

Further, the optical resonator has a feature of including a piezoelectric adjustor which finely adjusts a resonator length formed by the two concave mirrors in accordance with the desired-wavelength laser light.

Further, the fiber amplifier has a feature of being structured with optical fibers including a core to which Yb is doped.

Effects of the Invention

With the above, according to the laser oscillation apparatus of the present invention, it is possible to stabilize resonance even when finesses of the optical resonator is increased and to generate strong laser light as accumulating laser light in the optical resonator.

Further, owing to that amplitude modulation is provided to the present apparatus being a self-oscillation system with combination of an accumulation resonator and an amplifier, circling laser light has a stable pulse configuration at intervals corresponding to a resonator length. Accordingly, since pulse operation causing strength increase concurrently in the accumulation resonator can be performed, higher peak strength can be obtained.

Further, in the present apparatus, owing to that amplitude modulation is provided to the self-oscillation system as electrically extracting a noise of the laser oscillator itself, it is possible to feedback a modulated signal which is accurately matched with a fundamental frequency of the system.

BRIEF DESCRIPTION OF THE DRAWINGS

FIGS. 5(a) and 5(b) indicate results with the resonator mirrors without coating measuring a PD1 signal with the spectrum analyzer as the modulator being ON.

FIGS. 8(a) and 8(b) illustrate observed results of noise peaks of the PD1 at reactivation mode-locking with the present apparatus due to spectrum analyzer measurement.

FIG. 9 indicates a pulse waveform of the PD1 observed with the oscilloscope at reactivation mode-locking with the present apparatus.

FIGS. 11(a) and 11(b) indicate results with the resonator mirrors having a reflection rate of 99% measuring a PD1 signal with the spectrum analyzer as the modulator being ON.

FIG. 12 indicates a pulse waveform of the PD1 with the resonator mirrors having a reflection rate of 99% observed with the oscilloscope as the modulator being ON.

FIGS. 14(a) and 14(b) indicate results with resonator mirrors without coating measuring a PD1 signal with the spectrum analyzer as a modulator being OFF.

FIG. 15 indicates a result with the resonator mirrors without coating measuring a monitor signal with the oscilloscope as the modulator being OFF.

FIGS. 16(a) and 16(b) indicate results with the resonator mirrors without coating measuring a PD1 signal with the spectrum analyzer as the modulator being ON.

FIGS. 17(a) and 17(b) indicate results with the resonator mirrors without coating measuring a PD1 signal with the oscilloscope as the modulator being ON.

FIGS. 20(a) and 20(b) indicate results with the resonator mirrors having a reflection rate of 90% measuring a PD1 signal with the spectrum analyzer as the modulator being ON.

FIGS. 21(a) and 21(b) indicate waveforms of a PD1 signal with the resonator mirrors having a reflection rate of 90% as the modulator being ON.

EMBODIMENT OF THE INVENTION

1. Description of a First Embodiment of the Present Invention

Figure 1:
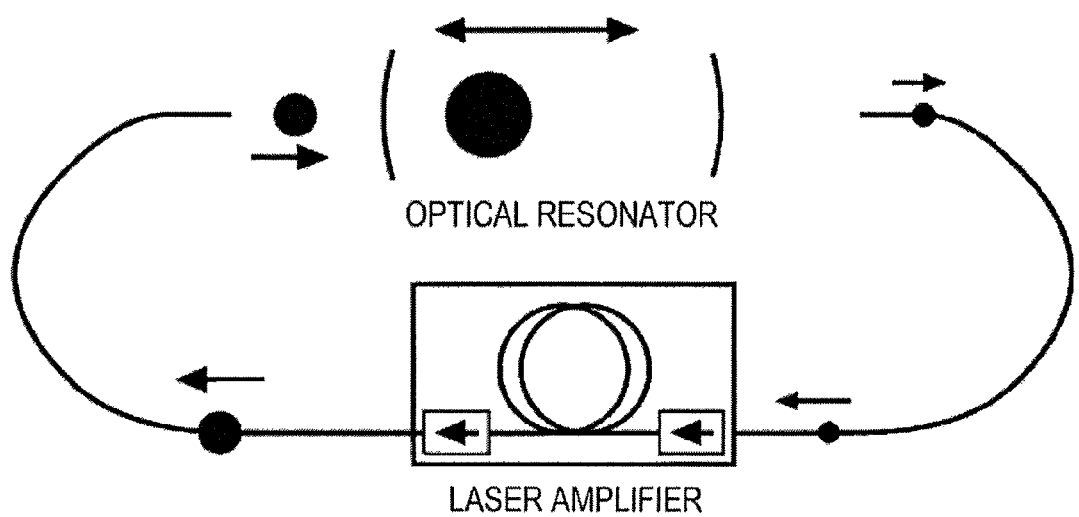
FIG. 1 illustrates a concept of a circling oscillation type optical accumulation apparatus.

FIG. 1 is a view illustrating a concept of a circling oscillation type optical accumulation apparatus being a self-oscillation system having a feature that a laser oscillation apparatus is structured by entire integration of an optical resonator and a laser amplifier. Since the oscillation circuit itself automatically follows resonance conditions, there is an advantage that a resonance state is maintained without any control performed. When a gain at an amplifying portion exceeds a loss of the circling including a resonator portion, the system is to be in an oscillation state and laser light automatically continues to circle on an optical path. The oscillation starts with spontaneous emission optical noise of the amplifier. A spectrum component received by chance into a resonance width of the optical resonator among noise light passes through the optical resonator, and then, is to be amplified in circling as being seed light thereafter. Eventually, the entire energy to excite the laser amplifier is aggregated into the component and the system is to be in a steady state when the amplifying portion is saturated.

The above is different from a traditional type in that the resonator portion and the amplifying portion configure the laser oscillator as being integrated as a whole. In the traditional type, deviation from resonance conditions due to vibration and the like is forcedly prevented with a high-speed and high-accuracy feedback technology. In contrast, since the oscillation circuit itself automatically follows resonance conditions, the new type has an advantage that a resonance state is maintained without any control performed.

An amplifying portion having a high gain is required for compensating a loss of a complicated optical path transmitted through a resonator. Therefore, a fiber amplifier capable of obtaining a high gain with a single path is a key of development of the system. A closed optical system (circling oscillation) which generates self-oscillation was conceived owing to basic study on an optical accumulation resonator and high-efficiency fiber laser amplifying method. In the optical resonator of a high finesse type, only resonating laser light is accumulated. Accordingly, accumulation of laser light is actualized with stable laser light amplification by returning laser light transmitted through the optical resonator to a high-efficiency fiber laser amplifier.

Confirmation was obtained on capability of amplifying laser light resonating in the optical resonator with the high-efficiency fiber laser amplifier and accumulating laser light laser light obtained through stable amplification in the optical resonator.

The pulse laser light is amplified to at least 10,000 times of strength of laser light for excitation owing to the self-oscillation amplification.

Then, confirmation was obtained on capability of generating beams of a range from a soft X-ray to a γ-ray as placing the optical resonator in an emission path of an accelerator which accelerates an electron beam, guiding the electron beam sufficiently accelerated at the accelerator to the emission path, and colliding the electron beam directly with laser light in the optical resonator.

Figure 2:
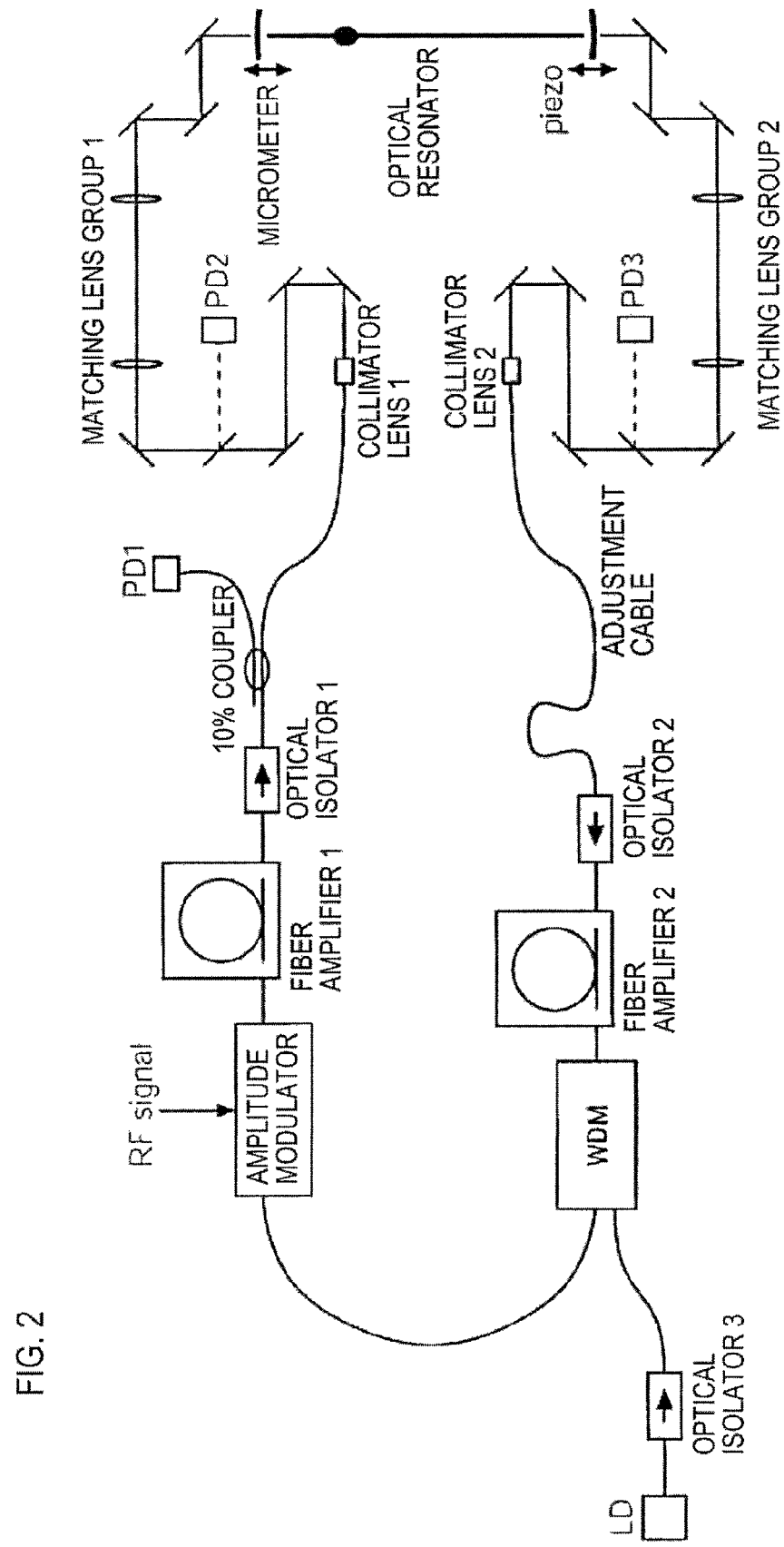
FIG. 2 illustrates a structure of a laser oscillation apparatus with circling oscillation type optical accumulation according to a first embodiment of the present invention.

FIG. 2 illustrates a laser oscillation apparatus according to a first embodiment of the present invention. In this drawing, a free-space optical system at the right half includes an optical resonator, a pair of matching lens groups 1 and 2 which are arranged as sandwiching the optical resonator, and a pair of collimator lenses which are located respectively at an input end and an output end. A fiber optical system at the left half forms a closed loop with the free-space optical system having an adjustment cable, a branching/multiplexing unit (WDM), an optical isolator, a fiber amplifier and an amplitude modulator connected with fibers.

To be on the safe side for a gain to satisfy oscillation conditions, two fiber amplifiers are arranged and both of the fiber amplifiers 1, 2 are Yb fiber amplifiers. A Yb fiber is a double-clad type fiber having Yb doped to a core. When laser light (laser light for excitation) with a predetermined wavelength is supplied and excited, the Yb fiber generates and supplies laser light with a wavelength being different therefrom.

Optical isolators 1, 2 are inserted at two positions to define a circling direction. According to the optical isolator, laser light supplied to a terminal is emitted from a terminal after passing therethrough.

A laser light source which generates laser light for excitation is structured with a laser diode LD, an optical isolator 3, and the abovementioned branching/multiplexing unit (WDM). The laser diode is structured with a semiconductor laser element and the like which generate laser light having a wavelength required for exciting the fiber amplifier. When drive voltage is received, the laser diode generates laser light and supplies the laser light to the optical isolator on a route in the order of the laser diode, the optical fiber and a terminal of the optical isolator.

According to a configuration of the optical isolator 3, laser light supplied to a terminal is emitted from a terminal after passing therethrough. Further, laser light supplied to the terminal is blocked so as not to be emitted from the terminal. When laser light is supplied from the laser diode, the optical isolator 3 introduces the laser light via the optical fiber which is connected to the terminal and makes the laser light pass therethrough to emit the laser light from the terminal, so that the laser light is supplied to the branching/multiplexing unit on a route in the order of the terminal, the optical fiber and the branching/multiplexing unit. Further, when laser light supplied to the terminal via the optical fiber as being emitted from the branching/multiplexing unit, the laser light is blocked to protect the laser diode.

According to a configuration of the branching/multiplexing unit, when laser light having a first wavelength and laser light having a second wavelength are entered from respective terminals at one side, multiplexing thereof is performed to be emitted from a terminal at the other side. Further, when multiplexed laser light is entered from the terminal, branching thereof is performed and the branched laser light is emitted respectively from the terminals. When laser light is emitted from the optical isolator 3 and supplied to the terminal which is connected to the optical fiber, the branching/multiplexing unit introduces and supplies the laser light to the fiber amplifier 2 which is connected to the terminal. Further, when laser light is emitted from the fiber amplifier 2 and supplied to the terminal, the branching/multiplexing unit branches the laser light, emits the laser light having the branched wavelength from the terminal, and supplies the laser light to the optical isolator on a route in the order of the terminal of the branching/multiplexing unit, the optical fiber and the terminal of the optical isolator.

Further, according to a configuration of the optical isolator 2, laser light supplied to a terminal is introduced and emitted from a terminal after passing therethrough. Further, laser light supplied to the terminal is blocked so as not to be emitted from the terminal. When laser light emitted from the branching/multiplexing unit is supplied on a route in the order of the terminal of the branching/multiplexing unit, the optical fiber and the terminal, the optical isolator 2 supplies the laser light to the optical system on a route in the order of the terminal, the optical fiber, the amplitude modulator, the fiber amplifier 1 and the optical isolator 1 while making the laser light pass therethrough. Further, when laser light is supplied from the optical system on a route in the order of the optical system, the optical fiber and the terminal, the optical isolator 1 blocks the laser light to prevent returning to the branching/multiplexing unit.

Here, the adjustment cable is arranged at the circulation optical path for finely adjusting an optical path length of the circulation optical path. The adjustment cable is formed of a fiber as well.

The adjustment cable and the fiber amplifier are polarization-nonconservative. Here, since a polarization face is required to be matched to a polarization-conservative system at the modulator and after, a paddle-type polarization controller is inserted. A 10% coupler is arranged at the end of the fiber system, so that a part (10%) of circling light is extracted and monitored with a photodiode (PD).

To cause pulsing with an active mode-locking method, the amplitude modulator is driven with an RF signal provided from the outside.

The matching lens group 1 is connected to the fiber via the collimator lens 1 as including a plurality of mirrors which reflect laser light and matching lenses which adjust a laser light diameter and the like. The matching lens group 1 introduces laser light from the collimator lens 1, adjusts a diameter, a polarization direction and the like while reflecting the laser light, and enters the laser light to the optical resonator which is placed in the emission path of an accelerator for accelerating an electron beam.

The optical resonator includes a resonator body (not illustrated) which is placed in the emission path of the accelerator for accelerating an electron beam, a concave mirror which is attached to the resonator body having a reflection rate being 90% or higher and a curvature radius of 250 mm, a concave mirror which is attached to the resonator body having a reflection rate being 90% or higher and a curvature radius of 250 mm as being apart from the concave mirror by a distance corresponding to a wavelength of laser light in a fashion that concave faces are mutually opposed, and a piezoelectric element which adjusts a position, an attaching angle and the like of the concave mirror with deformation thereof in accordance with applied voltage as being placed between a back face of the concave mirror and the resonator body. When laser light is supplied from the matching lens group 1 or the matching lens group 2 to the back face of each concave mirror, the optical resonator causes the laser light to transmit through the concave mirrors while confining and adjusts a phase thereof while confining and accumulating the laser light between the concave mirrors. In parallel to the above operation, a part of strong laser light accumulated between the concave mirrors is emitted from the respective concave mirrors and supplied to the matching lens group 1 and the matching lens group 2.

The matching lens group 2 is connected to the fiber via the collimator lens 2 as including a plurality of mirrors which reflect laser light and matching lenses which adjust a laser light diameter. The matching lens group 2 introduces supplied laser light, adjusts a diameter, a polarization direction and the like while reflecting the laser light, and enters the laser light to the optical resonator. Further, the matching lens group 2 introduces laser light emitted from the optical resonator, adjusts a diameter, a polarization direction and the like while reflecting the laser light, and supplies the laser light to a terminal of an output coupler via the optical fiber as emitting from the collimator lens 2.

As described above, laser light is entered to the optical resonator from the fiber to the free space after being emitted from the collimator lens 1 and adjusted with the pair of matching lenses. A length of the optical resonator is adjusted to 420 mm (frequency: 357 MHz) with later-mentioned adjustment. A micrometer stage is attached to one resonator mirror to be used for fine adjustment of the optical resonator length. The other optical resonator mirror is piezoelectrically driven to be used for scanning at the time of adjustment. Laser light passes through a symmetric optical system after transmitting through the optical resonator and is input to the fiber again from the collimator lens 2. A part thereof is reflected by a beam sampler at some midpoint. PD2 monitors the reflected light of the resonator and PD3 monitors transmitted light of the optical resonator.

Respective parts are monitored by PD1 to PD3. At that time, it is required to establish association between monitored power and power at each part of the circulation optical path. This is because calibration is required to be performed in a case that an oscillation wavelength of the apparatus being about 1035 nm is different from a wavelength of each element of a commercially available resonator mirror or the like. As monitoring points of the circulation optical path in the above case, association is established by measuring power of each part using ASE light generated with excitation of the fiber amplifier 1.

Description will be performed on adjustment of repetition frequency of the optical resonator and adjustment of the circulation optical path for performing pulse operation of a self-oscillation system with the abovementioned structure.

To determine an optical system in the free space, the adjustment is to be performed using mode-locking laser at 714 MHz, for example. First, it is targeted to accurately determine the resonator length of the optical resonator. The resonator has a structure of FSR being 357 MHz while concave mirrors having a curvature diameter of 250 mm are mutually faced with a distance of 420 mm.

Figure 3:
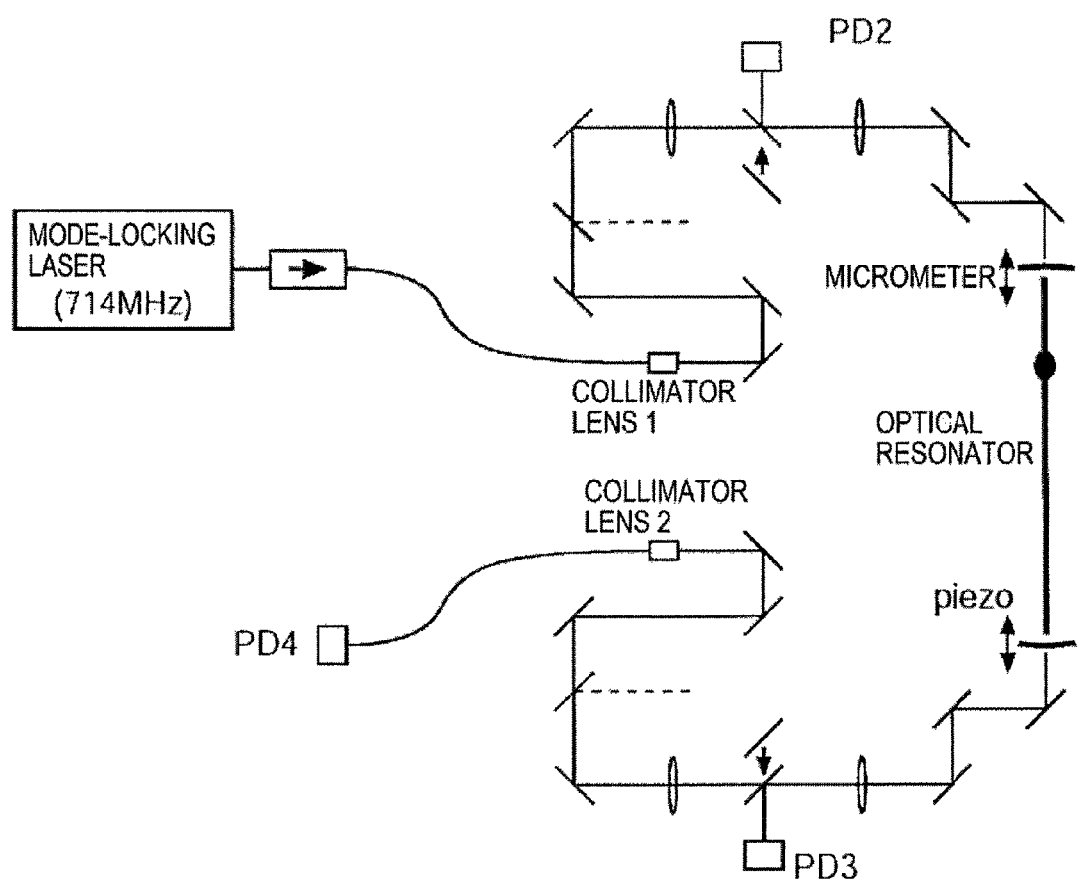
FIG. 3 illustrates a system for adjusting an optical system at a free space portion of the present apparatus.

As illustrated in FIG. 3, light from a mode-locking laser is conveyed by a fiber and is emitted as being connected to the collimator with a FC/APC connector. At that time, the adjustment is performed while checking transmitted light of the optical resonator. The optical resonator length is adjusted with a micrometer to maximize resonance. The matching is adjusted independently for an upstream side and a downstream side as switching fiber connection between a forward direction and a backward direction for matching. The matching of the entire optical system is confirmed by inputting in the forward direction and measuring a signal after re-inputting to the fiber at the emission side.

Next, adjustment of the circulation optical path will be described. A base plate of the optical resonator mirror can be replaced with another one having the same shape without coating. In this case, although an optical length which corresponds to the optical resonator length is included, a resonance phenomenon does not occur. Here, some matching deviation can be restored by finely adjusting the mirror at the fiber re-inputting portion. Thus, it is basically to be a simple ring-laser structure. When a signal of the photodiode PD1 is measured with a spectrum analyzer while the amplitude modulator is in an RF-OFF state and the fiber amplifier is ON, a super-mode noise peak corresponding to the optical path length of circulation can be observed. In this state, paddle adjustment of the polarization controller and DC-offset adjustment of the amplitude modulator are performed to maximize peak strength. In the present structure, since a fundamental frequency of circulation is on the order of 6.5 MHz, 55-times harmonics of the fundamental frequency are used to match the above to the target of 357 MHz. The length of the adjustment cable is adjusted so that the 55-th peak is matched with 357 MHz. In this example, it is possible to adjust to be 357.067 MHz. It is also considered to use a piezoelectric stretcher and a delay line to further improve accuracy. Further, viewing in a long span, super-mode noise peaks can be recognized at intervals of 6.49 MHz.

When an RF signal of 357 MHz adjusted to an integral multiple of a frequency corresponding to the circulation optical path length with the abovementioned adjustment is input to the amplitude modulator and pulse oscillation is caused, a modulated component at 357 MHz is strengthened and other noise peaks are suppressed. Thus, it is possible to obtain a pulse configuration at the modulation cycle. That is, as a result of introducing the amplitude modulation with oscillation as assembling the free-space accumulation resonator adjusted to have a repetition frequency of 357 MHz into the fiber amplifier system having the circulation optical path length adjusted to 55 times, circling light has a stable pulse configuration at intervals corresponding to the resonator length and strength increase concurrently occurs in the accumulation resonator.

Owing to measurement of a signal of PD1 with a spectrum analyzer, it is possible to recognize that the modulated component at 357 MHz pulses and oscillates as being strengthened.

The resonator mirror is specified to have a reflection rate of 90% or 99% at a wavelength of 1064 nm. Similarly, a transmission rate was measured as entering ASE light. According to the obtained results, the transmission rate was 7.5% with the 90% mirror and the transmission rate was 1.3% with the 99% mirror. Here, the description uses names of the 90% mirror and the 99% mirror. When power in the resonator is actually estimated from resonance transmission light power, calculation is to be performed from a transmission rate of the measurement results.

Proof verification of the apparatus will be described. Description is performed on the results of measurements in states that the amplitude modulator is ON and OFF (a cable for inputting to the amplitude modulator is disconnected from a coupler) respectively in the cases of the resonance mirror of the optical resonator being without coating, with the reflection rate being 90%, and the reflection rate being 99%.

a) Result with Resonator Mirrors without Coating

Figure 4A:
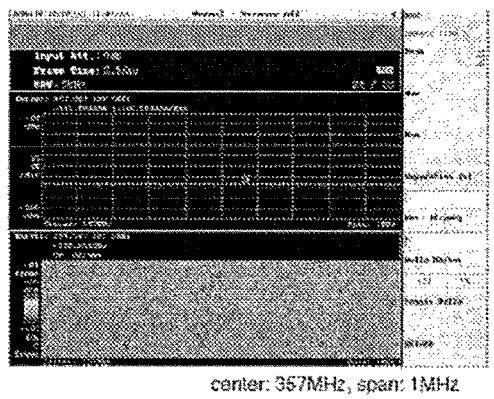
FIGS. 4(a) and 4(b) indicate results with resonator mirrors without coating measuring a PD1 signal with a spectrum analyzer as a modulator being OFF.
Figure 4B:
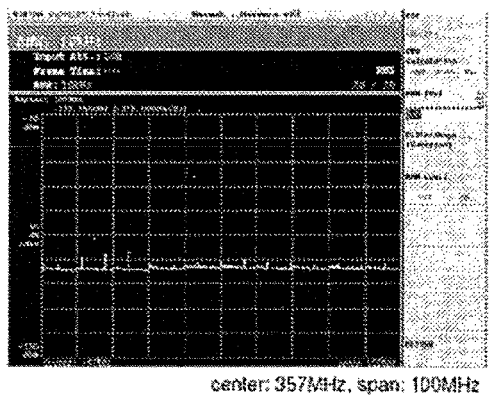

FIGS. 4(a) and 4(b) indicate measurement results of a PD1 signal as the modulator being OFF with a spectrum analyzer. In FIG. 4(a), a super noise peak appears in the vicinity of 357 MHz. Further, according to measurement of FIG. 4(b) in a long span, super-mode noise peaks can be observed at intervals of 6.5 MHz.

Figure 5A:
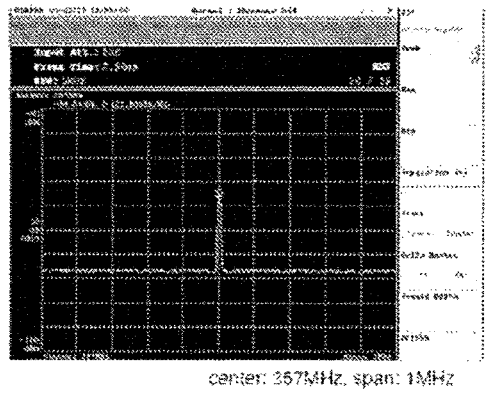
Figure 5B:
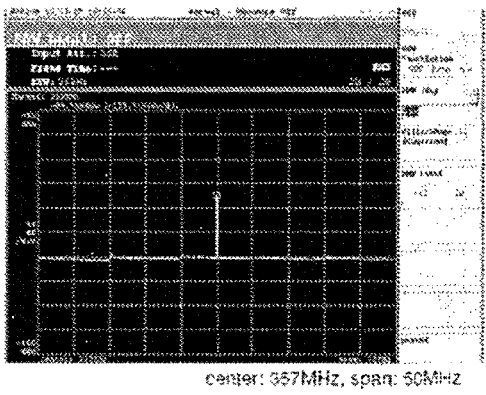
Figure 6:
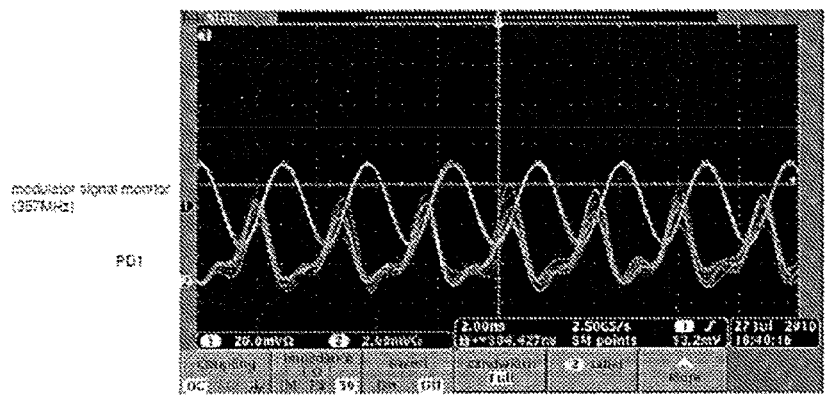
FIG. 6 indicates a waveform of a PD1 signal with the resonator mirrors without coating as the modulator being ON observed with an oscilloscope.

FIGS. 5(a) and 5(b) indicate measurement results of a PD1 signal as the modulator being ON with the spectrum analyzer. FIG. 5(a) indicates that a modulated component at 357 MHz is strengthened. FIG. 5(b) in a long span indicates that other noise peaks are suppressed. The pulse waveform of FIG. 6 obtained by observing the PD1 with an oscilloscope indicates that a pulse configuration is obtained at the modulation cycle.

b) Result with Resonator Mirrors Having Reflection Rate of 90%

Figure 7A:
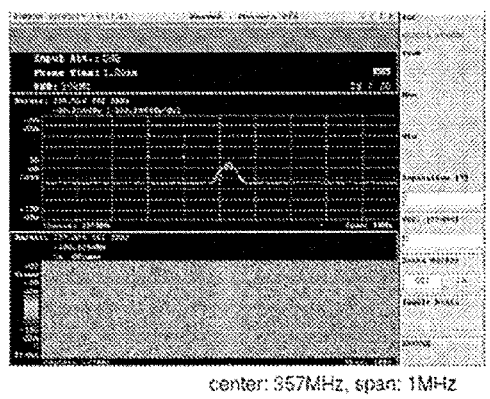
FIGS. 7(a) and 7(b) illustrate results with resonator mirrors having a reflection rate of 90% measuring a PD1 signal with the spectrum analyzer as the modulator being OFF.
Figure 7B:
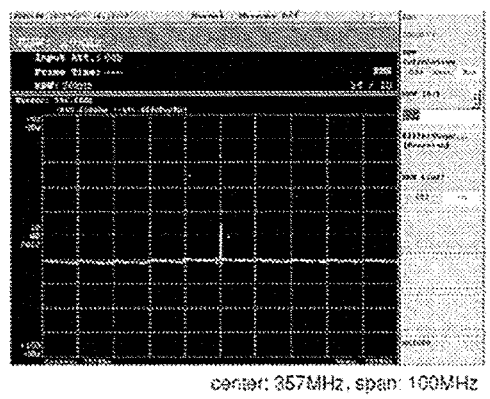

FIGS. 7(a) and 7(b) indicate measurement results of a PD1 signal as the modulator being OFF with the spectrum analyzer. In FIG. 7(a), a peak appears in the vicinity of 357 MHz. Further, FIG. 7(b) indicates that any super-mode noise peak is not observed even in a long span. This is because other peaks are suppressed by the resonator configuration.

FIGS. 8(a) and 8(b) indicate measurement results of a PD1 signal as the modulator being ON with the spectrum analyzer. FIGS. 8(a) and 8(b) in a long span indicate that a modulated component at 357 MHz pulses and oscillates as being strengthened. The pulse waveform of FIG. 9 obtained by observing the PD1 with the oscilloscope indicates that a stabler pulse series is formed than that in the case without coating.

c) Result with Resonator Mirrors Having Reflection Rate of 99%

Figure 10A:
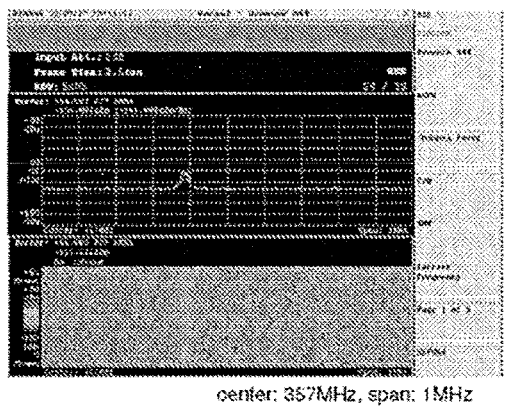
FIGS. 10(a) and 10(b) indicate results with resonator mirrors having a reflection rate of 99% measuring a PD1 signal with the spectrum analyzer as the modulator being OFF.
Figure 10B:
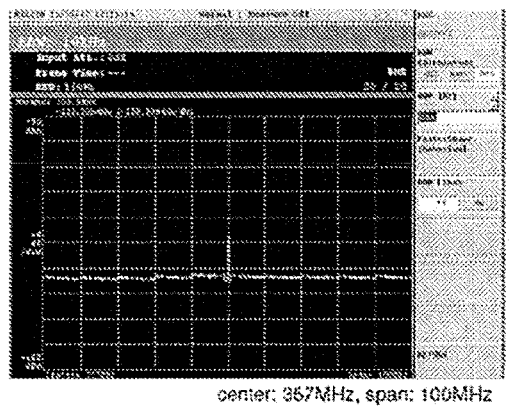

FIGS. 10(a) and 10(b) indicate measurement results of a PD1 signal as the modulator being OFF with the spectrum analyzer. In FIG. 10(a), a peak appears in the vicinity of 357 MHz. Further, FIG. 10(b) indicates that any super-mode noise peak is not observed even in a long span.

Figure 11A:
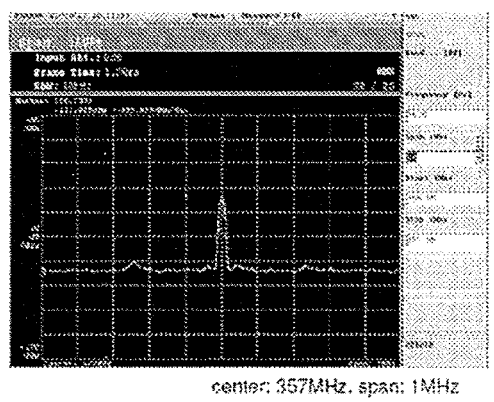
Figure 11B:
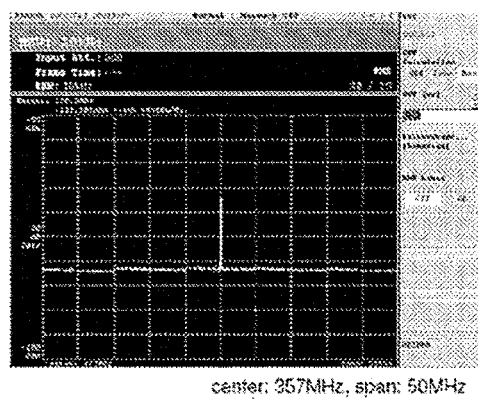
Figure 12:
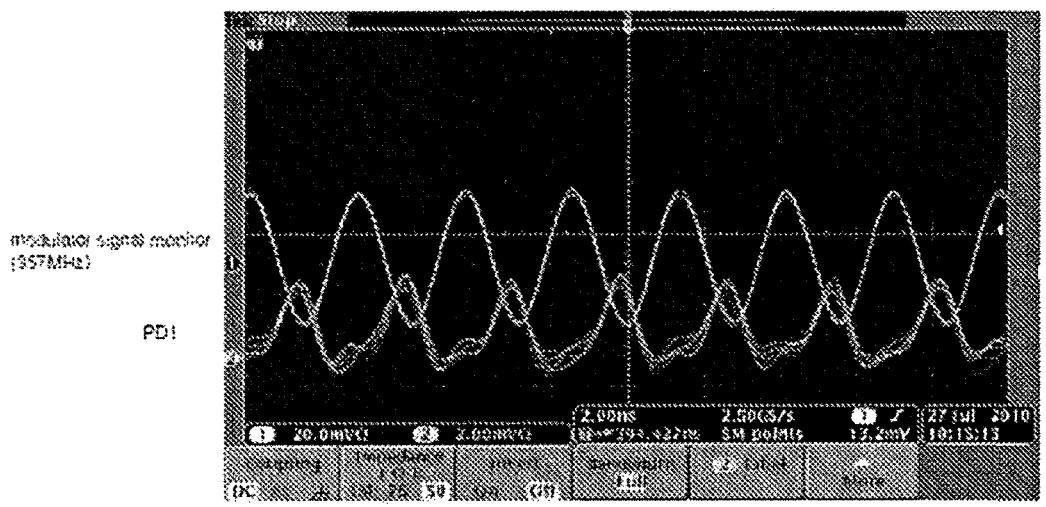

FIGS. 11(a) and 11(b) indicate measurement results of a PD1 signal as the modulator being ON with the spectrum analyzer. FIGS. 11(a) and 11(b) in a long span indicate that a modulated component at 357 MHz pulses and oscillate as being strengthened. The pulse waveform of FIG. 12 obtained by observing the PD1 with the oscilloscope indicates that a stabler pulse series is formed than that in the case without coating.

2. Description of a Second Embodiment of the Present Invention

In the description of the first embodiment of the present invention, harmonic pulsing is performed by forcedly providing amplitude modulation to the system of the laser oscillator using the external signal generator. According to this type, the structure is relatively simple and oscillating harmonics are easily varied.

In contrast, in a second embodiment described below, an amplitude modulator is driven by electrically extracting a noise of a laser oscillator itself instead of using an external modulation signal generator. Accordingly, it is possible to feedback a modulated signal which is accurately matched with a fundamental frequency of a system. According to the above type, owing to utilization of a reactivation mode-locking method in which a drive signal of the amplitude modulator is prepared by regenerating from the own oscillation signal, relation between a modulation signal and a circulation length remains the same even when an oscillation frequency itself is varied. Therefore, there is an advantage that pulse oscillation is stabled.

Figure 13:
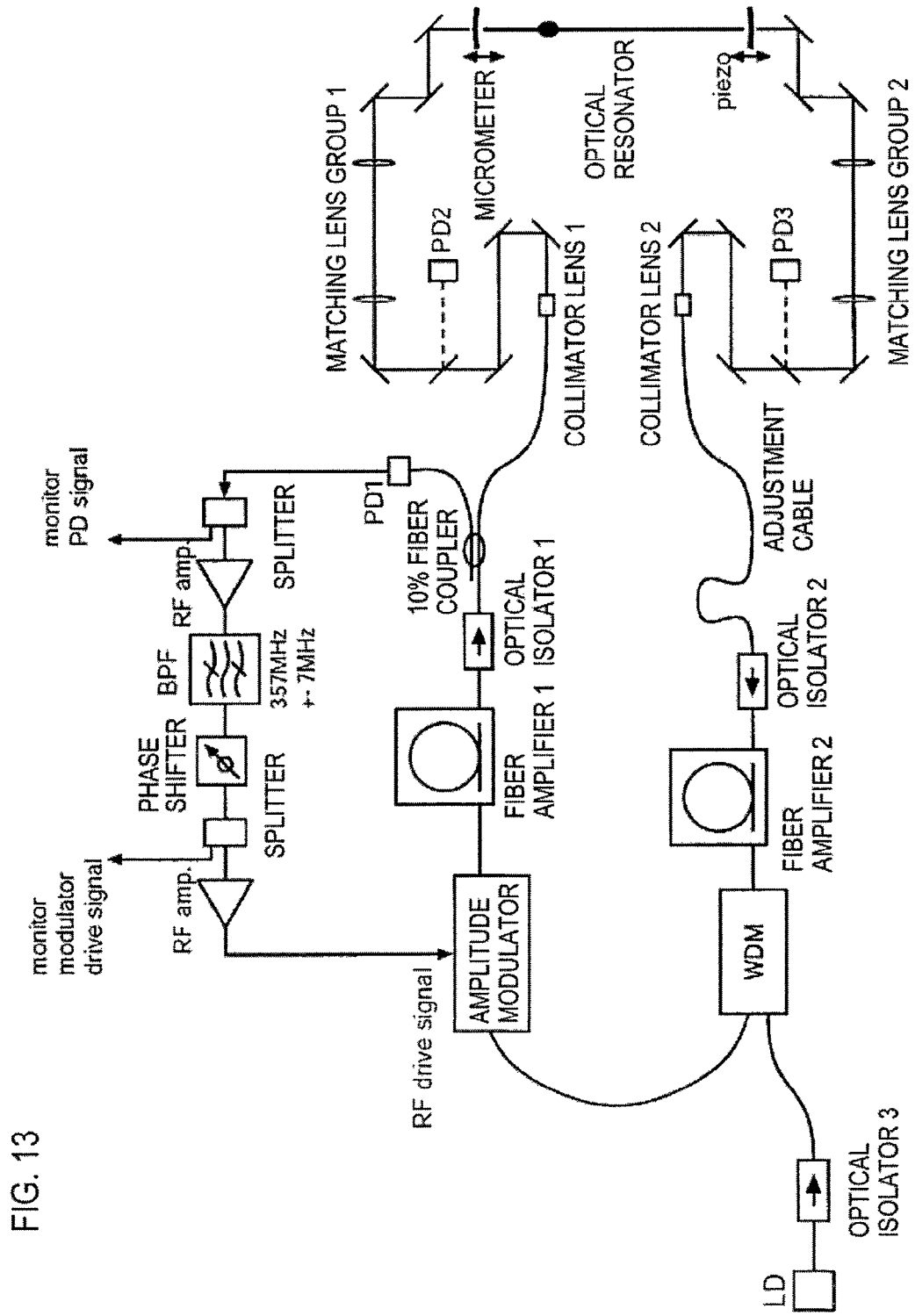
FIG. 13 illustrates a structure of a laser oscillation apparatus which adopts a reactivation mode-locking method for performing amplitude modulation on laser light.

FIG. 13 illustrates a structure of a laser oscillation apparatus which adopts a reactivation mode-locking method for performing amplitude modulation on laser light. Having a similar structure to FIGS. 2(a) and 2(b), it is different therefrom in including a feedback circuit which feedbacks a modulation signal to the amplitude modulator as electrically extracting a noise of the laser oscillator itself.

The feedback circuit monitors with the photodiode (PD1) as extracting a part of light from the 10% fiber coupler. The electric signal of the PD1 is amplified and components to be grown are extracted from super-mode noises by a band-pass filter (BPF) of 357 MHz±7 MHz. The above is amplified by an RF amplifier to have an appropriate amplitude after appropriately adjusting a phase thereof with a phase shifter, so that the amplitude modulator which is arranged at the input side of the fiber amplifier is driven.

Further, similarly to the structure of FIGS. 2(a) and 2(b), the optical path length of the circulation optical path is arranged by inserting an adjustment cable with a length thereof adjusted so that the fundamental frequency is 6.49 MHz and the 55-th harmonics is matched with 357 MHz of the accumulation resonator.

Then, owing to capability of monitoring the circling pulse configuration by dividing the PD1 signal into two with a splitter and capability of monitoring the feedback signal by dividing the signal to be returned to the amplitude modulator into two as well, effects of the present system can be recognized by observing the signals with an oscilloscope or a spectrum analyzer.

Proof verification of the present apparatus will be described. Measurement is performed on cases of adopting the resonator mirrors of the optical resonator without coating and adopting the resonator mirrors having a reflection rate of 90%. For verifying effects due to reactivation mode-locking, comparison is performed between a case that the feedback loop is opened by detaching a cable to input to the amplitude modulator from a connector and a case that the loop is closed.

a) Result with Resonator Mirrors without Coating

FIGS. 14(a) and 14(b) indicate measurement results of a PD1 signal as the modulator being OFF with a spectrum analyzer. In FIG. 14(b), super noise peaks appear at intervals of 6.49 MHz and FIG. 14(a) indicates that the 55-th peak exists in the vicinity of 357 MHz. FIG. 15 obtained by measuring the monitor signal with an oscilloscope indicates a random waveform because a noise is formed of a plurality of components. Further, super-mode noise peaks can be observed in a long span at intervals of 6.5 MHz.

FIGS. 16(a) and 16(b) indicate measurement results of a PD1 signal as the modulator being ON with the spectrum analyzer. FIG. 16(a) indicates growing of a super noise peak.

FIG. 16(b) in a long span indicates that other noise peaks are suppressed. With the pulse waveforms of FIGS. 17(a) and 17(b) obtained by observing the PD1 with an oscilloscope, FIG. 17(a) indicates occurrence of a pulse configuration and FIG. 17(b) indicates stable pulse oscillation in a long span as well.

b) Result with Resonator Mirrors having Reflection Rate of 90%

Figure 18A:
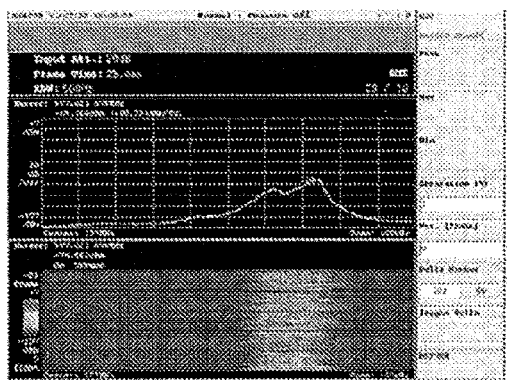
FIGS. 18(a) and 18(b) indicate results with resonator mirrors having a reflection rate of 90% measuring a PD1 signal with the spectrum analyzer as the modulator being OFF.
Figure 18B:
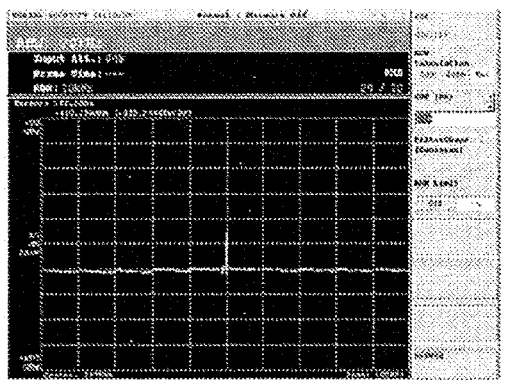
Figure 19A:
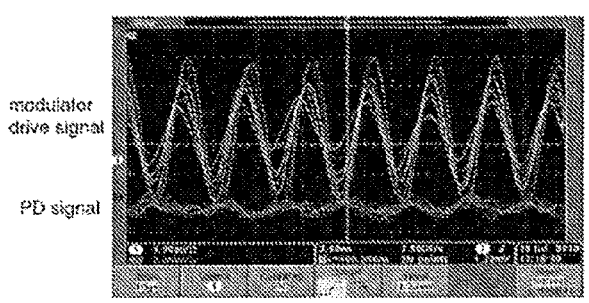
FIGS. 19(a) and 19(b) indicate waveforms of a PD1 signal with the resonator mirrors having a reflection rate of 90% as the modulator being OFF.
Figure 19B:
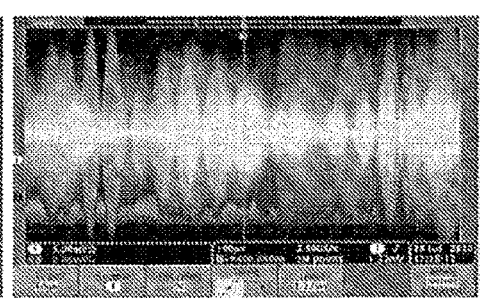

FIGS. 18(a) and 18(b) indicate measurement results of a PD1 signal as the modulator being OFF with the spectrum analyzer. In FIG. 18(a), a super noise peak appears at 357 MHz and FIG. 18(b) in a long span indicates that other peaks are suppressed owing to the effects of the resonator. FIGS. 19(a) and 19(b) indicate waveforms at that time. Since there are not many noise components, FIG. 19(a) in a short span indicates a waveform of 357 MHz, in particular, after a signal of BPF. However, FIG. 19(b) indicates that amplitude wavers unstably in long span observation.

Figure 20A:
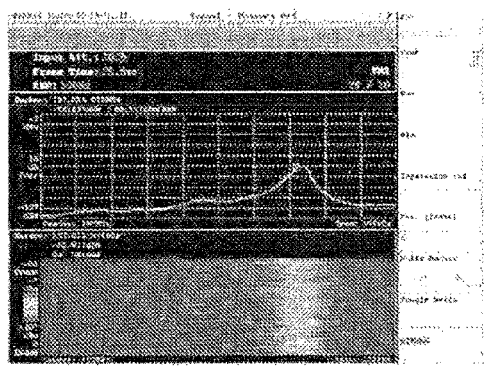
Figure 20B:
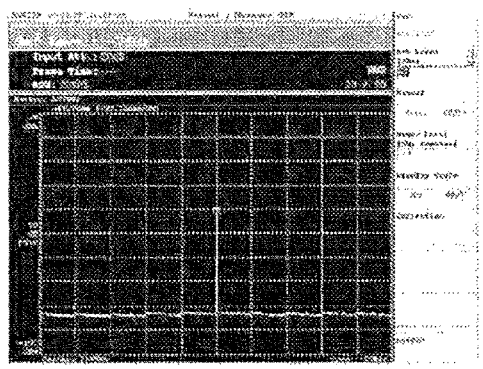
Figure 21A:
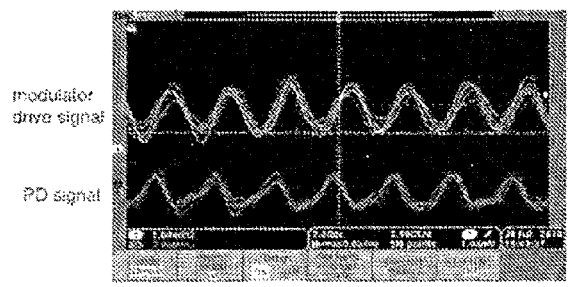
Figure 21B:
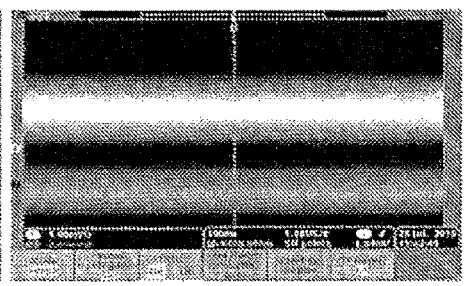
Figure 22:
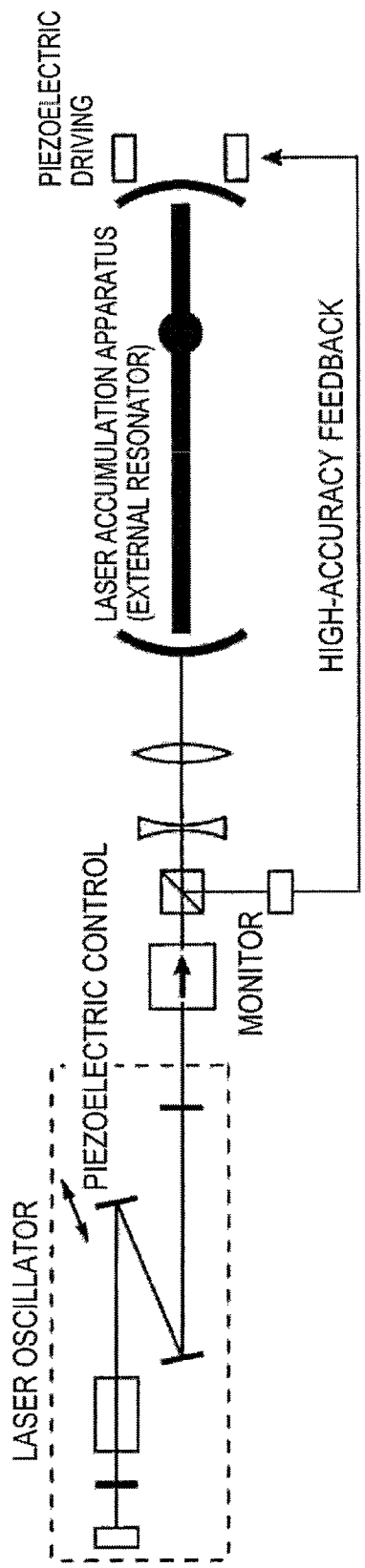
FIG. 22 illustrates a structure of a traditional laser accumulation apparatus.

FIGS. 20(a) and 20(b) indicate measurement results of a PD1 signal as the modulator being ON with the spectrum analyzer. FIG. 20(a) and FIG. 20(b) indicate that oscillation signals are sharped as well. FIGS. 21(a) and 21(b) indicate waveforms at that time. Both of FIGS. 21(a) and 21(b) indicate that pulse oscillation is stabled.

The above measurement results indicate that optimization of a modulation frequency can be automatically performed with the apparatus of the present invention by electrically extracting an appropriate harmonics signal from an oscillation noise peak and using the signal for amplitude modulation. Accordingly, owing to that an appropriate harmonics signal is electrically extracted from an oscillation noise peak and is used for amplitude modulation, optimization of a modulation frequency can be automatically performed and pulse oscillation can be stabled.

INDUSTRIAL APPLICABILITY

The present invention relates to a laser apparatus which generates strong laser light, and in particular, relates to light source laser utilizing laser Compton scattering to be capable of stably oscillating even when finesses of an optical resonator is increased. Moreover, high peak strength can be obtained by introducing amplitude modulation. Thus, the present invention has industrial applicability.

The invention claimed is:

1. A laser oscillation apparatus which generates pulse light with an optical resonator and a plurality of fiber amplifiers arranged at a circulation optical path, comprising:
a laser light source which generates laser light for excitation;
a first fiber amplifier which includes a mode-locking type amplitude modulator to operate light with a desired frequency to be grown as being an integral multiple of a frequency corresponding to an optical path length of the circulation optical path and which emits pulse laser light with the desired frequency while the laser light generated by the laser light source is entered;
an optical resonator which resonates and accumulates the pulse laser light emitted from the first fiber amplifier;
a second fiber amplifier which includes an adjustment cable corresponding to a wavelength of the pulse laser light and which amplifies the pulse laser light emitted from the optical resonator;
a first photodiode which extracts a part of the laser light from the first fiber amplifier;
a splitter which divides an output signal of the first photodiode into two;
a first RF amplifier which amplifies one of the two output signals from the splitter;
a band-pass filter which extracts an RF signal of the laser light with the desired frequency among output signals of the first RF amplifier;
a phase modulator which performs phase modulation of the RF signal passing through the band-pass filter;
a second RF amplifier which drives the amplitude modulator with the phase-modulated RF signal; and
a second photodiode which monitors the other of the two output signals from the splitter,
wherein the pulse laser light is self-oscillation-amplified and accumulated in the optical resonator as circling on the circulation optical path which is structured with the first fiber amplifier, the optical resonator and the second fiber amplifier, and
the adjustment cable on the circulation optical path is a cable which finely adjusts the optical path length of the circulation optical path.

2. The laser oscillation apparatus according to claim 1, wherein the pulse laser light is amplified to at least 10,000 times of strength of the laser light for excitation owing to the self-oscillation amplification.

3. The laser oscillation apparatus according to claim 1, wherein the optical resonator is a Fox Smith interferometer type resonator including at least two concave mirrors which are mutually faced at a predetermined interval.

4. The laser oscillation apparatus according to claim 3, wherein the optical resonator includes a piezoelectric adjustor which finely adjusts a resonator length formed by the two concave mirrors in accordance with the desired frequency laser light.

5. The laser oscillation apparatus according to claim 1, wherein the first fiber amplifier and the second fiber amplifier are structured with optical fibers which includes a core to which Yb is doped.

* * * * *